(12) United States Patent
Münzenberger et al.

(10) Patent No.: US 10,907,751 B2
(45) Date of Patent: Feb. 2, 2021

(54) FIRE PROTECTION ELEMENT

(71) Applicant: Hilti Aktiengesellschaft, Schaan (LI)

(72) Inventors: Herbert Münzenberger, Wiesbaden (DE); Paul Langford, Schindellegi (CH); Ulf Mordau, Waal (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/461,031

(22) PCT Filed: Feb. 7, 2018

(86) PCT No.: PCT/EP2018/053012
§ 371 (c)(1),
(2) Date: May 15, 2019

(87) PCT Pub. No.: WO2018/153667
PCT Pub. Date: Aug. 30, 2018

(65) Prior Publication Data
US 2019/0271416 A1     Sep. 5, 2019

(30) Foreign Application Priority Data

Feb. 22, 2017 (EP) .................................. 17157376

(51) Int. Cl.
*F16L 5/00* (2006.01)
*F16L 5/04* (2006.01)
(Continued)

(52) U.S. Cl.
CPC ................ *F16L 5/04* (2013.01); *A62C 2/065* (2013.01); *B32B 3/12* (2013.01); *H02G 3/0412* (2013.01); *H02G 3/22* (2013.01)

(58) Field of Classification Search
CPC ... F16L 5/04; A62C 2/065; B32B 3/12; H02G 3/0412; H02G 3/22
See application file for complete search history.

(56) References Cited

U.S. PATENT DOCUMENTS 3,976,825 A    8/1976   Anderberg
5,344,106 A    9/1994   Beele
(Continued)

FOREIGN PATENT DOCUMENTS

EP    0 534 563    3/1993
EP    2 607 761    6/2013
(Continued)

OTHER PUBLICATIONS

International Search Report dated Apr. 9, 2018 in PCT/EP2018/053012 with English translation.
Written Opinion dated Apr. 9, 2018 in PCT/EP2018/053012.

*Primary Examiner* — Beth A Stephan
(74) *Attorney, Agent, or Firm* — Grüneberg and Myers PLLC

(57) ABSTRACT

A fire protection element is useful for the separation of openings passing through walls or ceilings, in particular of line passages. The fire protection element has a molded part made from intumescent material with a plurality of through-openings for the passage of lines which extend in particular parallel to each other from a first side to an opposite second side of the fire protection element. In each case, the through-openings for the passage are tightly sealed relative to flue gas by a membrane.

20 Claims, 5 Drawing Sheets

(51) Int. Cl.
*A62C 2/06* (2006.01)
*B32B 3/12* (2006.01)
*H02G 3/04* (2006.01)
*H02G 3/22* (2006.01)

(56) References Cited

U.S. PATENT DOCUMENTS

| | | | | |
|---|---|---|---|---|
| 5,887,396 | A * | 3/1999 | Thoreson | A62C 2/065 |
| | | | | 52/232 |
| 8,006,447 | B2 | 8/2011 | Beele | |
| 8,393,121 | B2 * | 3/2013 | Beele | F16L 5/04 |
| | | | | 169/45 |
| 8,813,450 | B1 * | 8/2014 | Hensley | E04B 1/6804 |
| | | | | 52/396.01 |
| 9,121,527 | B2 | 9/2015 | Munzenberger et al. | |
| 2005/0257460 | A1 * | 11/2005 | Semler | F16L 5/04 |
| | | | | 52/232 |
| 2006/0213138 | A1 * | 9/2006 | Milani | F16L 5/04 |
| | | | | 52/317 |
| 2007/0066745 | A1 | 3/2007 | Beele | |
| 2012/0216791 | A1 * | 8/2012 | Munzenberger | A62C 2/065 |
| | | | | 126/314 |
| 2013/0161030 | A1 | 6/2013 | Munzenberger et al. | |
| 2016/0123002 | A1 * | 5/2016 | Munzenberger | H01B 17/26 |
| | | | | 174/152 G |

FOREIGN PATENT DOCUMENTS

| | | | | |
|---|---|---|---|---|
| FR | 2 884 580 | | 10/2006 | |
| JP | 2002247735 | A * | 8/2002 | F16L 5/04 |
| WO | 2004/096369 | | 11/2004 | |
| WO | 2011/151937 | | 12/2011 | |

* cited by examiner

FIRE PROTECTION ELEMENT

This application is a National Stage entry under § 371 of international Application No. PCT/EP2018/053012, filed on Feb. 7, 2018, and which claims the benefit of European Application No. 17157376.9, filed on Feb. 22, 2017.

BACKGROUND OF THE INVENTION

Field of the Invention

The invention relates to a fire-protection element for sealing of openings, especially of line passages, that are routed through walls or ceilings, having a molded part of intumescent material.

Discussion of the Background

Fire-protection elements, which are capable of sealing line passages of non-fire-resistant pipes or cables in ceilings or walls in the fire situation, in order to prevent the spread of fire and smoke in buildings, are known in the most diverse configurations. The fire-protection elements usually contain an intumescent material containing expandable graphite, which is disposed around the lines, and a reinforcing inlay, which stabilizes the intumescent material.

In the known fire-protection elements, the expandable-graphite particles are activated by heat at the surface, expand toward the fire and for the time being form an insulating crust. After some time, however, this becomes unstable and drops off. Thus the crust is no longer available as an insulating layer and the intumescent layer situated underneath is activated. In this way, the fire-protection element burns away step-by-step and ensures protection for only a limited duration.

BRIEF SUMMARY OF THE INVENTION

The object of the invention is to create a fire-protection element in which a more stable crust is formed in the fire situation and which makes it easier to lay lines in orderly manner.

As the solution to the object, a fire-protection element is provided for sealing of openings, especially of line passages, that are routed through walls or ceilings, having a molded part of intumescent material. The molded part has several passage openings for the routing of lines, which in particular extend parallel to one another from a first side to an opposite second side of the fire-protection element and are respectively sealed in a manner impervious to smoke gas by a membrane. The multiple passage openings in the fire-protection element make it possible easily to route different types of lines in a manner separated from one another through the fire-protection element, for example by the fact that power and data cables respectively occupy their own passage openings. In this way, the fire-protection element may be used as a cable-management system. The said membrane ensues that unoccupied passage openings are impermeable to smoke gas. In order to route a line through a passage opening, the membrane in the corresponding passage opening is perforated. A single membrane may be provided that seals all passage openings, for example by the fact that the membrane extends substantially through the entire molded part. Alternatively, several membranes may also be provided that respectively seal only part of the passage openings or even only individual passage openings.

The molded part preferably has a honeycomb structure. Within the meaning of the invention, a honeycomb structure is a three-dimensional grid, which in a sectional plane is constructed from one or more basic shapes in the form of polygons and extends along an axis that in particular is oriented perpendicular to the sectional plane. Preferably, the honeycomb structure has a uniform, hexagonal basic shape and in this way forms a kind of honey or bee comb. The advantage of the inventive fire-protection element is that, by virtue of the grid-like honeycomb structure, the intumescent material is able to expand into the honeycomb and bond there with intumescent material of adjacent honeycomb structures. Hereby a crosslinked stable crust, which ensures reliable fire protection for a longer time, is formed in the fire situation.

In a preferred embodiment, the membrane is disposed in the middle between the first and the second side and extends preferably parallel to one of these sides. Hereby the membrane divides the passage opening into two portions, which have the same depth perpendicular to the first or second side. By the fact that the membrane is disposed in this way, the fire-protection element may be structured symmetrically with respect to the membrane, whereby the fire-protection element has the same properties on both sides of the membrane.

At least one part of the passage openings may be filled with a filling foam. The filling foam ensures smoke-tight sealing of the passage opening when it has been perforated by a line, by the fact that the passage opening is filled, especially completely, by the filling foam. Furthermore, the filling foam functions as bearing means for the line as well as for sound absorption.

According to an advantageous embodiment, the fire-protection element has a frame that surrounds the molded part at least in portions in a peripheral direction, especially wherein the peripheral direction extends around an axis disposed parallel to the axial extent of the passage openings. In this situation, preferably the first and the second side of the molded part are not covered by the frame. By the fact that the molded part is integrated in a frame, the molded part is protected and stabilized. In this way, the intumescent crust survives longer in the fire situation, the molded part burns more slowly and the fire-protection properties of the fire-protection element are improved.

The frame is preferably made in one piece. This offers the advantage that only a few transition regions, in which intumescent material and/or filling material is able to emerge in the fire situation, are present between various portions of the frame. In this way, the frame limits spreading of the intumescent material in the fire situation and thus is able to steer the expansion of the intumescent material in a desired direction. Since the intumescent material therefore can no longer spread in uncontrolled manner in all directions, the quantity of intumescent material in the fire-protection element can be reduced, whereby lower manufacturing costs are achieved. Furthermore, various portions of the frame stabilize one another mutually during expansion of the intumescent material, and so the structural integrity of the fire-protection element is improved by this configuration.

It is of advantage when the frame comprises a material from the following group: cardboard, metal, glass fibers, basalt fibers, carbon fibers or ceramic fibers. A hybrid structure of the frame comprising several materials is also possible. Compared with the intumescent material of the molded part, these materials have a higher temperature resistance. This is advantageous, since the frame is not impaired by the temperature that activates the intumescent material and so is able to exert its stabilizing function in this way even in the fire situation.

Preferably, the frame comprises a metal sheet, an expanded metal, a mineral building panel, a glass-fiber mesh or fabric. The use of a fabric offers good joining of the frame to the molded part. Furthermore, a frame comprising a fabric retains its stabilizing properties even in the presence of isolated structural damage.

The frame may comprise an intumescent material, wherein the intumescent material may be identical to the intumescent material of the honeycomb structure. Hereby the frame expands in addition to the intumescent material of the honeycomb structure in the fire situation and ensures impervious sealing of the opening as well as a secure bearing means for the fire-protection element in the opening.

In a further preferred embodiment, the fire-protection element has a cover plate, in order to protect the molded part. The cover plate is provided in particular to cover the first or the second side of the fire-protection element that are situated outwardly, i.e. potentially turned toward the fire. It is of advantage when the cover plate covers one side of the molded part substantially completely. Several cover plates may also be provided, especially one on the first side and one on the second side respectively.

The cover plate preferably comprises a material from the following group: cardboard, metal, glass fibers, basalt fibers, carbon fibers or ceramic fibers. A hybrid structure of the cover plate comprising several materials is also possible. Compared with the intumescent material of the molded part, these materials have a high temperature resistance and improve the fire-protection properties of the fire-protection element.

Preferably, the cover plate comprises a metal sheet, an expanded metal, a mineral building panel, a glass-fiber mesh or fabric. The use of a fabric has the advantage that lines may be routed more easily through the cover plate. Furthermore, a cover plate comprising a fabric retains its structural integrity even in the presence of isolated damage.

The cover plate may contain an intumescent material. Hereby the cover plate represents an additional intumescent layer, which improves the fire-protection properties of the fire-protection element.

It is of advantage when the molded part contains expandable graphite. By the fact that the intumescent material forming the walls of the passage openings contains expandable graphite as an essential ingredient, stems of expandable-graphite particles are formed in the passage openings in the fire situation and become intertwined with other stems of expandable-graphite particles on opposite walls to form clusters. In this way, a cross-linked structure of expandable-graphite particles is formed in the fire situation, thus ensuring particularly high stability of the intumescent crust and thus decisively improving the fire-protection properties of the fire-protection element.

The molded part is preferably rectangular or cylindrical, and in particular has the shape of a circular cylinder. Alternatively, the molded part may be a prism. The said fire-protection element has substantially the same shape. This configuration has the advantage that the fire-protection element is suitable in particular for sealing of rectangular or round openings, which are the most frequently occurring in practice. Furthermore, molded parts having these shapes can be manufactured inexpensively and can be stored in a manner making more efficient use of space.

Further advantages and features will become obvious from the description hereinafter in conjunction with the attached drawings, wherein:

DETAILED DESCRIPTION OF THE INVENTION

Figure 1A:
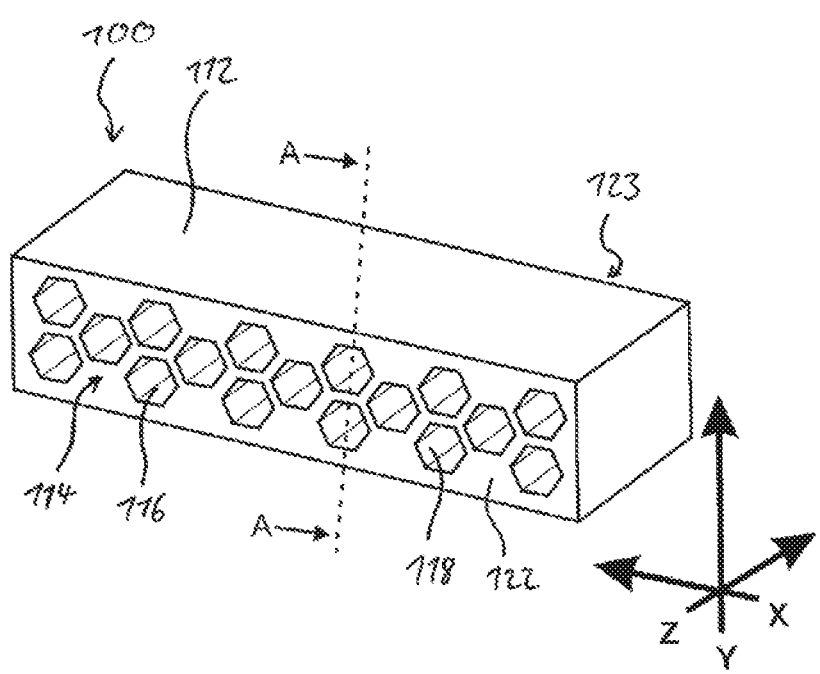
FIG. 1a shows a perspective diagram of a first embodiment of an inventive fire-protection element.

In FIG. 1a, an inventive fire-protection element 100 having a molded part 112 of intumescent material is shown that is intended for fireproof sealing of building-part openings having line passages such as cables and/or pipes.

Molded part 112 is an approximately rectangular block, the edges of which extend along the axes X, Y and Z of an orthogonal coordinate system.

In an alternative embodiment, the molded part 112 may have any desired geometry that is suitable for securely sealing an opening routed through walls or ceilings. In particular, molded part 112 may be designed in the shape of a circular cylinder or of a prism.

Molded part 112 has a honeycomb structure 114, which is formed by passage openings 116 in the manner of honeycombs having an equilateral hexagonal basic shape in the X-Y plane and the honeycomb walls 118 of which extend axially in Z-direction. This means that the passage openings 116 are disposed parallel to one another.

Figure 1B:
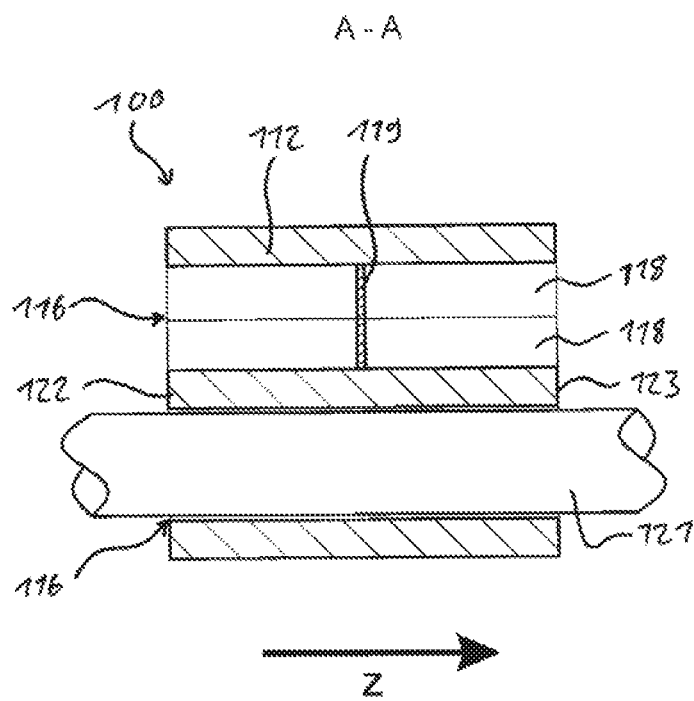
FIG. 1b shows a sectional view of the fire-protection element from FIG. 1a with a line routed through it.

The passage openings 116 are provided in tubular form and respectively have a membrane 119 (see FIG. 1b), which completely seals passage opening 116 in the X-Y plane. By means of membranes 119, passage openings 116 are sealed in a manner impervious to smoke gas, so that fire-protection element 100 is inherently impervious to smoke as well as gases.

Passage openings 116 are configured in a manner identical to one another. Alternatively, passage openings 116 that have different opening cross sections in terms of both shape and size may also be provided.

In a preferred embodiment, especially passage openings 116 may be provided that have a circular cross-sectional area and a diameter that is matched to the diameter of corresponding lines 121. In this way, lines 121 may be routed through passage openings 116 having a corresponding diameter, so that honeycomb wall 118 or in this case the inside wall of passage opening 116 bears tightly on line 121, preferably by means of a press fit. Thus the imperviousness of molded part 112 to smoke gases is ensured even after perforation of membrane 119, without the need for further measures for this purpose, such as spraying of passage opening 116 with a sealing foam.

Passage openings 116 may be arranged in substantially any desired manner. However, it is advantageous when passage openings 116 are disposed in a symmetric pattern, in order that similar fire-protection properties may be ensured over the entire fire-protection element 100.

Passage openings 116 extend from a first end face 122 to an opposite second end face 123 of molded part 112. Thus passage openings 116 extend in Z-direction through the entire molded part 112.

Membrane 119 is disposed in the axial middle of passage opening 116, i.e. at the same distance from and parallel to the two end faces 122, 123.

In the shown embodiment, a separate membrane 119 is provided for each passage opening 116. Alternatively, molded part 112 may have a membrane 119 that extends at least in portions through molded part 112 and seals several or all passage openings 116.

In an alternative embodiment, one part of passage openings 116 may be provided without membrane. In this case, fire-protection element 100 would be permeable to air at least in portions in axial Z-direction. Hereby fire-protection element 100 is able, for example, to ensure the necessary ventilation in a gap of a wall having a curtain facade, but is also able to seal the gap in the fire situation by the reaction of the intumescent material.

Passage openings 116 are provided as penetrations for lines in axial direction Z through molded part 112. For routing of a line 121, membrane 119 of the corresponding passage opening 116 is perforated. The perforation of membrane 119 may be carried out by means of a tool, for example a lance, or without a tool, by using the end of line 121 as a lance.

Depending on diameter of line 121 and cross section of passage opening 116, a passage opening 116 may be provided for one or more lines 121.

The intumescent material from which molded part 112 is formed comprises a proportion of expandable graphite and, depending on requirement, may have special intumescence behavior (including foam height and pressure), by means of which fire-protection element 100 may be adapted to different service conditions.

The intumescent material has in particular an intumescent volume that ensures secure sealing of passage openings 116 in the fire situation.

Membrane 119 may be made of the same intumescent material as molded part 112.

Alternatively, membrane 119 may consist of any desired material that is impervious to smoke gas and preferably has a higher temperature resistance than the intumescent material of molded part 112 and preferably may be perforated without tool by means of the end of a line 121.

It is of advantage when membrane 119 is elastic, so that it may be placed tightly around one or more lines 121 routed through it and thus is able to seal passage opening 116.

Due to the multiple passage openings 116 spaced apart from one another, fire-protection element 100 represents an arranging system, which makes it easy to sort and to group various lines. In this way, fire-protection element 100 may be used as a line-management system or line-arranging system.

Furthermore, at least some of the passage openings 116 may be specially configured for a particular type of lines. For example, a passage opening 116 for communication cables could be provided with a sheath for shielding of electromagnetic interfering fields.

Figure 2:
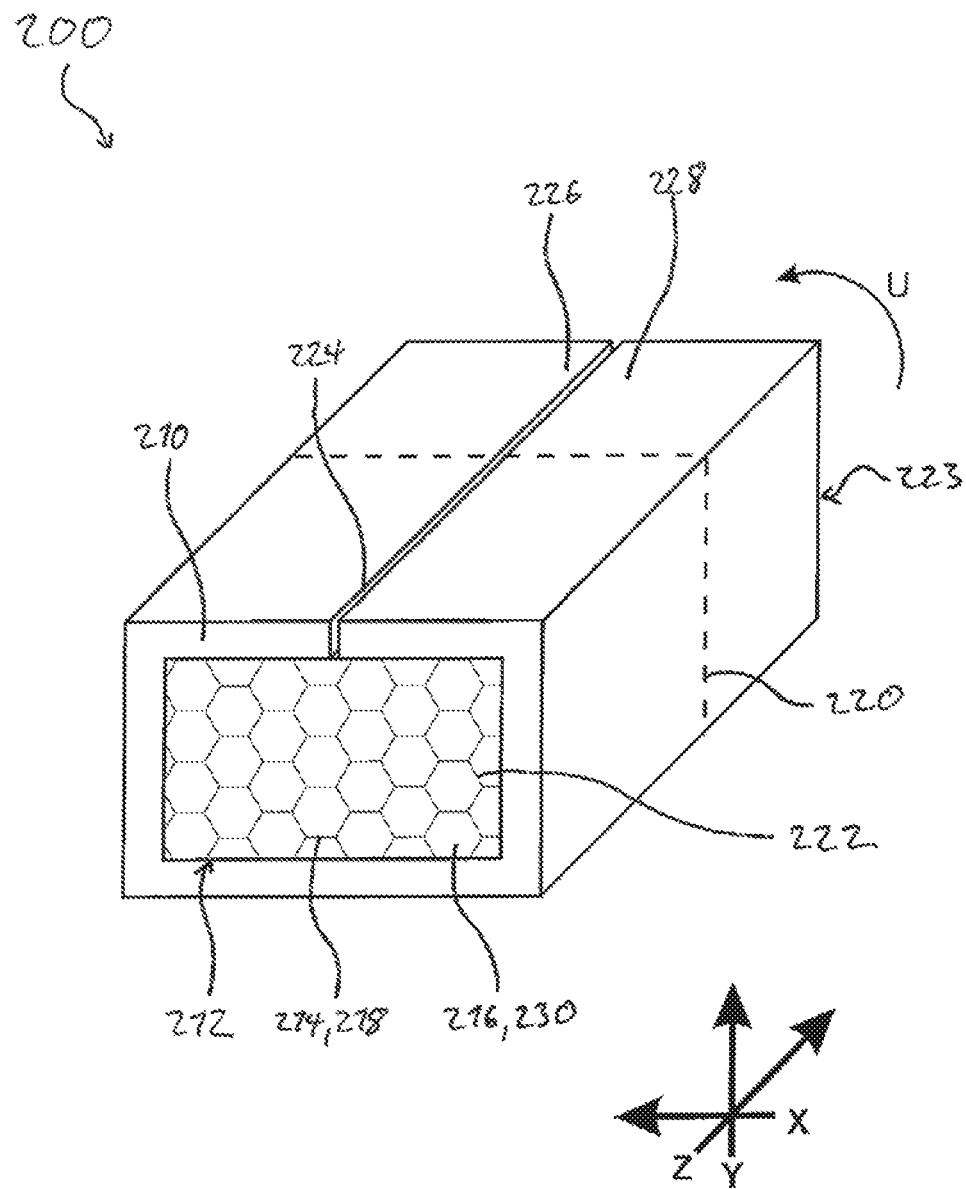
FIG. 2 shows a perspective diagram of a second embodiment of an inventive fire-protection element.

In FIG. 2, a further embodiment of an inventive fire-protection element 200 is shown that comprises a frame 210 as well as a molded part 212 of intumescent material having passage openings 216 in the form of honeycombs, which forms honeycomb structure 214. Compared with the first embodiment of fire-protection element 100, honeycomb structure 214 extends over the entire molded part 212, which otherwise, however, is designed in a manner identical to molded part 112 of fire-protection element 100. In particular, molded part 212 has at least one membrane, which seals passage openings 216. Thus corresponding reference symbols are used hereinafter for like structure having like functions.

Fire-protection element 200 is rectangular and is enclosed at its periphery 220 in peripheral direction U by frame 210, wherein end faces 222, 223 of molded part 212 remain free. Peripheral direction U extends around the Z-axis, which is disposed parallel to the axial alignment of passage openings 216. Thus end faces 222, 223 have the basic shape of honeycomb structure 214 in the X-Y plane and passage openings 216 extend in Z-direction through the entire molded part 212.

The invention is not limited to fire-protection elements 200 having rectangular molded parts 212 and frame 210, but instead it also comprises fire-protection elements 200 that have any desired shape and any desired cross section.

Frame 210 covers periphery 220 completely except for a narrow slit 224. This slit 224 is formed by two oppositely disposed ends 226, 228 of frame 210, which face one another on one side of fire-protection element 200.

Figure 4:
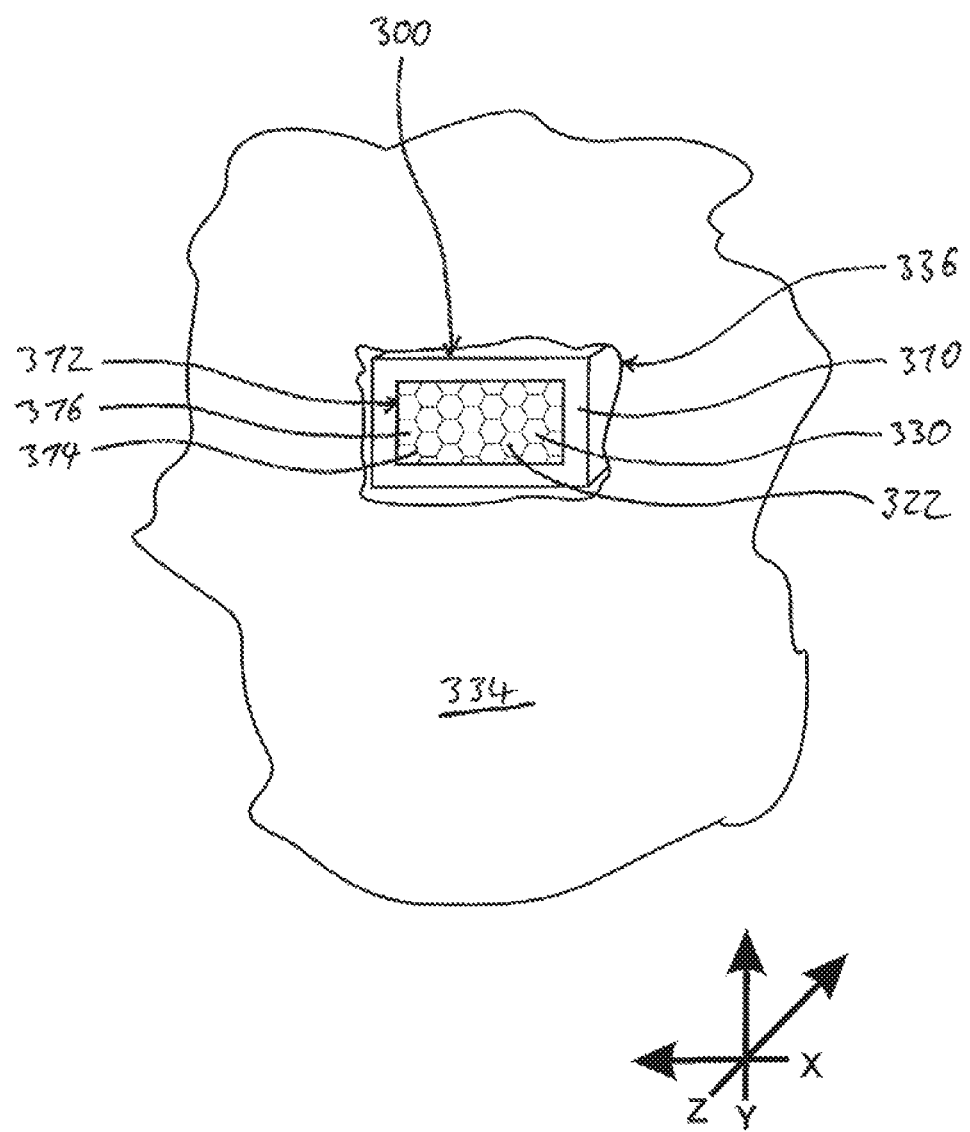
FIG. 4 shows a perspective diagram of a third embodiment of an inventive fire-protection element, which is installed in an opening.

In an alternative embodiment, frame 210 may be closed in peripheral direction U and not have any slit 224 (see FIG. 4).

Frame 210 is preferably made in one piece. Alternatively, frame 210 may be formed from several portions joined to one another.

Passage openings 216 are filled with a flexible filling foam 230. Alternatively, passage openings 216 may be filled with a pressure-stable filling foam 230.

Filling foam 230 contains substantially no fire-protection additives. Alternatively, filling foam 230 may comprise fire-protection additives, in order to improve the fire-protection properties of fire-protection element 200.

Passage openings 216 are preferably filled uniformly with filling foam 230, in order to ensure homogeneous properties over the entire molded part 212.

In an alternative embodiment, at least part of passage openings 216 may be filled in portions with a filling foam 230. For example, passage openings 216 may be filled with filling foam 230 only at the end faces 222, 223, while passage openings 216 are empty in the interior. In this way, filling foam 230 may be saved and the weight of fire-protection element 200 may be reduced.

Furthermore, various passage openings 216 may be filled with different filling foams 230, or molded part 212 may have empty passage openings 216, i.e. without filling foam 230, in order to combine the properties of the various filling foams 230 or of empty passage openings 216. It is further of advantage when different filling foams 230 can be identified, for example by a colored marking on end faces 222, 223. Among other possibilities, this permits simplified assembly, by the fact that lines may be routed selectively through passage openings 216 having a filling foam 230, which by virtue of its properties offers less resistance to the routing of lines or which bears closely on the lines and in this way ensures particularly high impermeability.

Filling foam 230 is joined securely, preferably by substance-to-substance bond, to honeycomb structure 214. Hereby it is ensured that filling foam 230 is not forced out of passage openings 216 when a line is routed through filling foam 230 or a penetration for a line is formed in filling foam 230.

Molded part 212 is joined securely, preferably by substance-to-substance bond, to frame 210.

Frame 210 consists of an expanded metal. In an alternative embodiment, frame 210 may be formed from a panel, a mat, a mesh or a fabric, which preferably consists of cardboard, metal, glass fibers, basalt fibers, carbon fibers or ceramic fibers.

In an alternative embodiment, frame 210 may comprise an intumescent material, especially the same intumescent material as honeycomb structure 214.

Frame 210 may be formed exclusively of intumescent material. Alternatively, frame 210 may additionally contain intumescent material, wherein the non-intumescent material of frame 210 may form a reinforcing inlay, which is applied on a layer of intumescent material or is disposed at least partly in a layer of intumescent material. In both cases, the layer of intumescent material is joined securely to the reinforcing inlay.

Fire-protection element 200 may have a cover plate 232 (see FIG. 3), which covers one side of fire-protection element 200, at least in portions.

Figure 3:
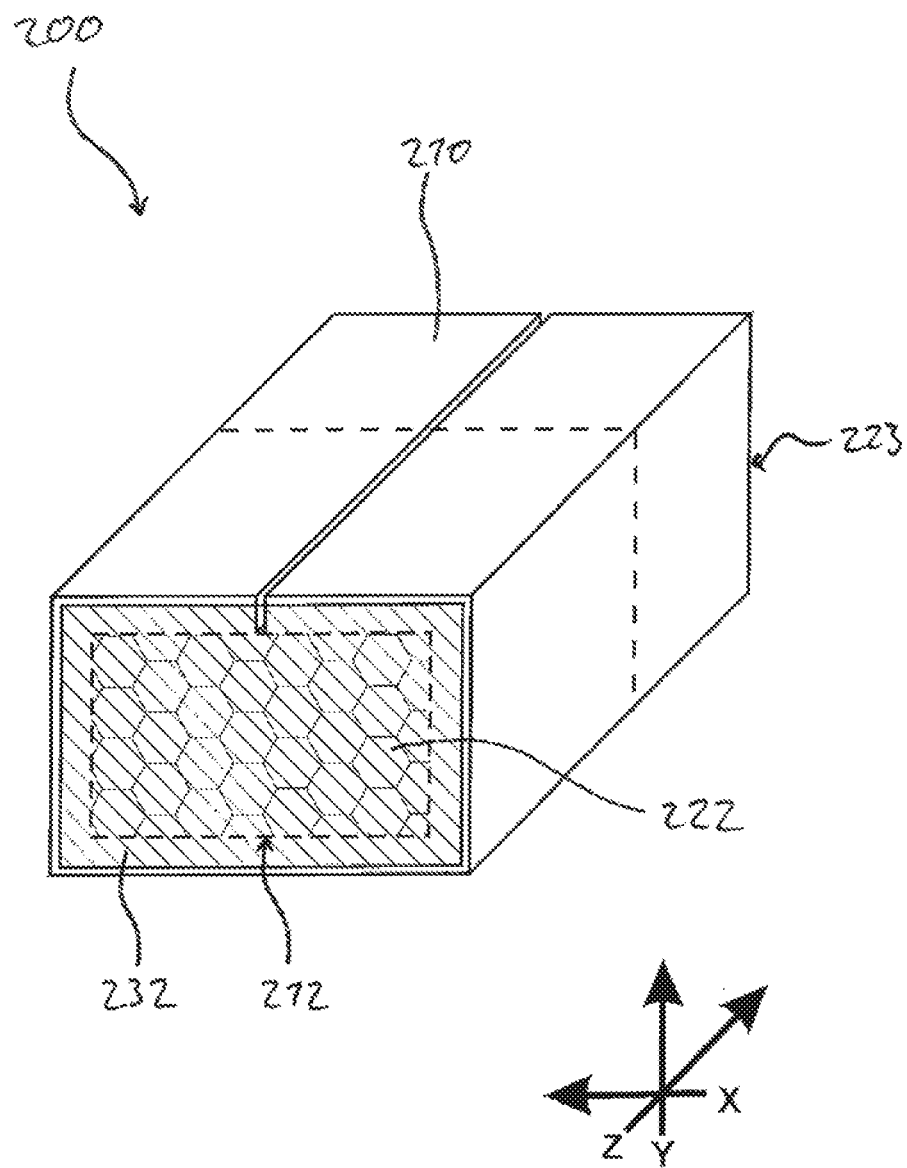
FIG. 3 shows a perspective diagram of the fire-protection element from FIG. 2 with a cover plate.

In FIG. 3, cover plate 232 covers end face 222 of molded part 212 and in this way forms an additional protective layer.

Cover plate 232 consists of expanded metal. In an alternative embodiment, cover plate 232 may be formed from a panel, a mat, a mesh or a fabric, which preferably consists of cardboard, metal, glass fibers, basalt fibers, carbon fibers or ceramic fibers.

In an alternative embodiment, cover plate 232 may comprise an intumescent material, especially the same intumescent material as honeycomb structure 214.

Cover plate 232 is joined securely, preferably by substance-to-substance bond, to molded part 212 and/or to frame 210.

According to a preferred embodiment, cover plate 232 has markings, which correspond to the arrangement of passage openings 216, so that lines may be routed selectively through the individual passage openings 216 under cover plate 232.

Fire-protection element 200 may have several cover plates 232, which are disposed on various sides of fire-protection element 200.

Several cover plates 232 may be disposed one beside the other and/or one above the other on one side of fire-protection element 200.

The manufacture of molded part 112, 212 of the inventive fire-protection element 100, 200 takes place by means of an intumescent foam, which is introduced into a mold having a corresponding geometry.

If a frame 210 of intumescent material is provided for fire-protection element 100, 200, it may be formed directly in this step by means of a corresponding mold.

If membrane 119 consists of the same intumescent material as molded part 112, 212, membrane 119 may be provided correspondingly in the mold, so that passage openings 116, 216 may be manufactured together with membrane 119 in one step.

Alternatively, membrane 119, especially when it consists of a material different from molded part 112, 212, may be inserted into the mold, so that molded part 112, 212 is appropriately formed around membrane 119 during manufacture.

In a further alternative manufacturing method, membrane 119 may be attached appropriately between two halves of molded part 112, 212, especially by substance-to-substance bond.

In a subsequent step, passage openings 116, 216 may be sprayed with a filling foam 230.

In order to form a fire-protection element 100, 200 having a frame 210, frame 210 may be provided in an open mold, for example as a panel or with a channel profile. Molded part 112, 212 is placed on the frame inner side and ends 226, 228 are folded around molded part 112, 212, whereby a closed frame 210 is formed.

Slits 224 in frame 210 may be sealed by a suitable fire-protection means, for example an intumescent inlay, and/or sprayed with an intumescent foam material.

Alternatively, molded part 112, 212 may also be inserted into an already formed frame 210.

Preferably, molded part 112, 212 has a small oversize, so that molded part 112, 212 is held in frame 210 by means of press fit and gaps are securely sealed.

In addition or alternatively, molded part 112, 212 may be fastened in frame 210 by substance-to-substance bond, for example by adhesive bonding, in order to prevent molded part 112, 212 from being forced out of frame 210.

In an alternative manufacturing method, frame 210 of fire-protection element 200 is formed first and then molded part 112, 212 is formed directly in frame 210. In this way, frame 210 may function as part of the mold used to manufacture molded part 112, 212.

Fire-protection element 100, 200 may be installed as a finished product in an opening to be sealed.

Alternatively, fire-protection element 100, 200 may be finished only in the opening to be sealed, especially by introducing filling foam 230 into passage openings 116, 216 only when molded part 212 is already disposed in the opening. In this case, passage openings 116, 216 may be used to route lines in a manner spaced apart from one another through fire-protection element 100, 200, before filling foam 230 is introduced.

In FIG. 4, a detail of a wall 334 having an opening 336 is shown, in which a fire-protection element 300 is installed as a firewall.

Fire-protection element 300 is disposed such that end face 322 is aligned substantially parallel to wall 334 and the sides covered by frame 310 point in the direction of wall 334. In this way, passage openings 316 extend in Z-direction through opening 336, and lines may be routed through fire-protection element 300 without damaging honeycomb structure 314 and/or frame 310 in the process. In this case, only the membrane that seals passage openings 316 (see FIG. 1b) must be perforated.

In order to route lines through fire-protection element 300, a penetration through which the line may be pushed may be created in filling foam 330, by means of a lance, for example.

In an alternative embodiment, passage openings 316 of fire-protection element may not be filled with a filling foam 330 and thus may be empty. In this case, the membrane (see FIG. 1b) ensures that fire-protection element 300 is impervious to smoke gas.

Figure 5:
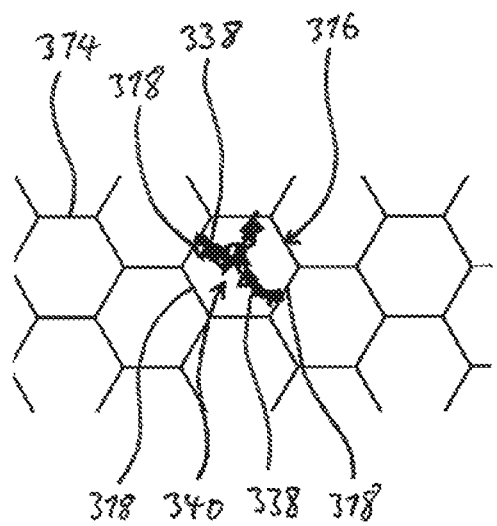
FIG. 5 shows a schematic diagram of a cluster of expandable-graphite particles in a honeycomb of the fire-protection element from FIG. 4.

In FIG. 5, it is illustrated by way of example, on the basis of a passage opening 316, how the inventive fire-protection element behaves in the fire situation. When a limit temperature is exceeded, the expandable-graphite particles in the honeycomb structure 314 are activated and expand as stems 338 in passage openings 316. There, stems 338 of various honeycomb walls 318 branch out and form clusters 340, which leads to cross-linking of honeycomb structure 314. In this way, the stability of the intumescent crust being formed is increased, whereby this offers longer-lasting protection.

Depending on whether, how or with which kind of filling foam passage openings 316 are filled, the spreading behavior of stems 338 and the formation of clusters 340 is influenced. By suitable choice of the fillings of passage openings 316 as well as of their arrangement, special cross-linking patterns may be provided hereby that impart particularly favorable fire-protection properties to fire-protection element 300 in the fire situation.

In this way, an opening routed through walls or ceilings can be sealed safely and durably, in rapid and simple manner, by the inventive fire-protection element. Due to the membrane, the inventive fire-protection element is impervious to smoke gas, even if not occupied by cables and without further measures. Furthermore, with the inventive fire-protection element, a fire-protection element is provided that, besides fire protection and imperviousness to smoke gas, offers the possibility of laying diverse kinds of lines simply in separated and sorted manner.

The invention is not limited to the shown embodiments. In particular, individual features of one embodiment may be contained in a further inventive embodiment independently of the other features of the corresponding embodiment, meaning that the described features may be combined in any desired manner.

The invention claimed is:

1. A fire-protection element for sealing of openings that are routed through walls or ceilings, the element comprising:
   a molded part of intumescent material, wherein the molded part has a plurality of passage openings, one or more of which are for routing one or more lines, the plurality of passage openings passing between a first side and a second side of the molded part; and
   a membrane in at least one of the plurality of passage openings,
   wherein the membrane comprises an elastic material that contacts around at least one of the one or more lines routed through the membrane, the contact sealing the at least one of the passage openings.

2. The fire-protection element according to claim 1, wherein the molded part has a honeycomb structure.

3. The fire-protection element according to claim 1, wherein the membrane is perforated and is disposed between the first side and the second side of the molded part.

4. The fire-protection element according to claim 1, wherein at least a part of the passage openings is filled with a filling foam.

5. The fire-protection element according to claim 1, wherein the fire-protection element has a frame that surrounds the molded part at least in portions in a peripheral direction.

6. The fire-protection element according to claim 5, wherein the frame comprises at least one material from the following group: cardboard, metal, glass fibers, basalt fibers, carbon fibers, and ceramic fibers.

7. The fire-protection element according to claim 5, wherein the frame comprises an intumescent material.

8. The fire-protection element according to claim 1, wherein the fire-protection element has a cover plate.

9. The fire-protection element according to claim 8, wherein the cover plate comprises at least one material from the following group: cardboard, metal, glass fibers, basalt fibers, carbon fibers, and ceramic fiber.

10. The fire-protection element according to claim 8, wherein the cover plate comprises an intumescent material.

11. The fire-protection element according to claim 1, wherein the molded part contains expandable graphite particles which expand under heat to form stems extending into the passages, the stems joining to form clusters that produce cross-linking patterns.

12. The fire-protection element according to claim 1, wherein the plurality of passages are of different sizes to accommodate routing of lines of different sizes.

13. A fire-protection element for sealing of openings that are routed through walls or ceilings, the element comprising:
    a block comprising a plurality of passages in a predetermined pattern, walls of the passages comprising expandable graphite particles which expand under heat to form stems extending into the passages, the stems joining to form clusters that produce cross-linking patterns, wherein the block comprises a fire-resistant material and wherein the plurality of passages extend from a first face of the block to a second face of the block, at least one of the plurality of passages comprising a line when the element is in an installed state.

14. The fire-protection element according to claim 13, wherein the block is an integrally molded block of fire-resistant material and wherein the fire-resistant material comprises an intumescent material which expands under heat to close off the plurality of passages.

15. The fire-protection element according to claim 13, wherein the plurality of passages are arranged in parallel to one another in the predetermined pattern.

16. The fire-protection element according to claim 13, further comprising: at least one membrane disposed within a corresponding one of the plurality of passages in the block between the first face and the second face.

17. The fire-protection element according to claim 13, wherein one or more of the plurality of passages comprises a foam material.

18. The fire-protection element according to claim 13, further comprising a frame comprising the block, wherein the frame surrounds the block and comprises a fire-resistant material.

19. The fire-protection element according to claim 18, wherein the frame comprises an intumescent material.

20. The fire-protection element according to claim 13, wherein each of the plurality of passages has a honeycomb structure.

\* \* \* \* \*